 3,084,148
PROCESS FOR POLYMERIZING DIOLEFINS
Edward A. Youngman, Lafayette, Kenzie Nozaki, El Cerrito, and John Boor, Jr., Richmond, Calif., assignors to Shell Oil Company, a corporation of Delaware
No Drawing. Filed Aug. 17, 1959, Ser. No. 833,952
14 Claims. (Cl. 260—94.3)

This invention relates to the polmerization of diolefins. More particularly, the invention relates to an improved process for polymerizing conjugated diolefins using certain metallic catalysts.

Specifically, the invention provides a new and improved process for polmerizing conjugated diolefins with certain metallic catalysts which gives products having a high cis 1,4 structure and improved processing properties. The process comprises contacting the conjugated diolefin in non-aqueous solution with a metal salt of the group consisting of divalent cobalt and nickel halides or nitrates, preferably in combination with organo aluminum compounds, in the presence of a zinc dialkyl.

It has been found that polybutadienes having high cis 1,4 structure can be cured to form rubber products having outstanding physical properties, such as excellent resiliency, particularly at lower temperature, good abrasion resistance and the like. Polymers having a high cis 1,4 content can be obtained by polymerizing the butadiene in a non-aqueous system in the presence of nickel or cobalt halides.

The measurement generally employed as an indication of the molecular weight of these polymers is the "intrinsic viscosity" (IV) expressed in deciliters per gram (dl./g.). The intrinsic viscosity of polybutadiene produced with the above-mentioned catalyst system in the absence of a reaction-modifying agent such as zinc dialkyl is usually in the range from 5.5 to 9 dl./g., or higher, determined in toluene at 25° C. For many uses, it is necessary to have IV values in the range from 1 to 5 dl./g.

Accordingly, it is an object of the invention to provide a new process for polymerizing diolefins. It is a further object to provide a new process for preparing polymers of conjugated diolefins that have a high cis 1,4 structure. It is a further object to provide a process for preparing polymers of conjugated diolefins having a high cis 1,4 structure and better milling properties. It is a further object to provide new polymers of butadiene having very high cis 1,4 structure and intrinsic viscosities between 1.0 and 5.0, and preferably between 1.0 and 3.0. These and other objects of the invention will be apparent from the following detailed description thereof.

It has now been discovered that these and other objects may be accomplished by the process of the invention which comprises contacting the conjugated diolefin with a metal salt of the group consisting of divalent nickel and cobalt halides or nitrates, preferably in combination with an organo aluminum compound and/or an acidic metal halide, in the presence of from 15 to 150 parts of zinc per million parts of total solution, said zinc being present as zinc dialkyl. It has been found that by the use of this special process one is able to obtain polymers of the conjugated diolefins which have high cis 1,4 structure and at the same time much better milling properties. For example, with the above process one is now able to obtain polymers of butadiene having a cis 1,4 content of above 96% and intrinsic viscosities varying from about 1.0 to 5.0. Prior polymers of this type having poor milling properties, on the other hand, had intrinsic viscosities between 5.5 and 9 or higher.

It has also been found that the process provides a good means for preparing polymers of predetermined molecular weight. By controlling the amount of the zinc dialkyl compound one can produce polymers having any desired intrinsic viscosities between the limits of about 1.0 and 5.0 dl./g. or higher.

The process of the invention may be applied to the polymerization of any hydrocarbon conjugated diolefin. It is particularly useful for the polymerization of butadiene-1,3 as this conjugated diolefin is found to polymerize, according to the present invention, with ease and to produce a polymer having a very high proportion of the cis 1,4 configuration. Other conjugated diolefins may be employed, however, such as, for example, 2,3-dimethyl butadiene-1,3, 2-ethyl butadiene-1,3, isoprene, 4-methyl hexadiene-1,3, 2-methyl pentadiene-1,3, 2-isopropyl butadiene-1,3, 2-amyl butadiene-1,3, piperylene and the like. Not only may any conjugated diolefin be polymerized but two or more conjugated dienes may be copolymerized to produce the desired products. A representative copolymer of this type is, for example, a copolymer of butadiene and isoprene prepared according to the present invention.

The catalysts used in the polymerization comprise the cobalt and nickel halides or nitrates or mixtures thereof. In all cases, the cobalt and nickel are in the divalent state. Examples of these include, among others, cobaltous bromide, cobaltous fluoride, cobaltous iodide, nickelous bromide, nickelous iodide and nickelous fluoride, nickel nitrate, cobalt nitrate and the like. Particularly preferred are the bromides and chlorides of cobalt and nickel. In the preferred embodiment, the salts are utilized in the purified form free of water of crystallization.

Th cobalt and nickel salts may be used alone or in certain combinations with other ingredients which modify the action of the catalyst and may be designated "cocatalysts." The following combinations of ingredients provide particularly outstanding results: (a) a cobalt or nickel salt in combination with an acidic metal halide; (b) a cobalt or nickel salt in combination with an acidic metal halide and an aluminum alkyl compound; and (c) a cobalt or nickel salt in combination with an organo-aluminum compound.

Of the acidic metal halides, aluminum halides are preferred. Aluminum chloride is particularly preferred, followed by aluminum bromide and the other aluminum halides. Resublimed aluminum chloride is particularly oustanding for the production of cis 1,4 polymer of conjugated dienes but represents an unnecessarily pure form of the halide. Other acidic metal halides that may be used in this invention include those of gallium, indium, zinc and other acidic halides of non-transition metals, with the chlorides thereof being best. Acidic metal halides herein means those halides which are known as Lewis acids, as defined, for example, in "Advanced Organic Chemistry" by G. M. Wheland, John Wiley and Sons, 1949, pages 80 et seq.

The organo-aluminum compounds employed in combination (c) may be any aluminum compounds having an organo radical. However, aluminum alkyls are preferred. The aluminum alkyls useful in combinations (b) and (c) include trialkyl aluminum, alkyl aluminum halides and alkyl aluminum hydrides. Representative alkyl aluminums include those represented by the formulas $AlR_3$ $AlR_2X$ and $AlRX_2$. In these formulas, R may be the same or different alkyl radicals of 1 to 10 carbon atoms such as methyl, ethyl, propyl, isopropyl, n-butyl, isobutyl, octyl, nonyl and the like. In the preferred embodiment the R's are lower alkyls having from 1 to 4 carbon atoms, with ethyl being particularly preferred. Included are, for example, aluminum triethyl, aluminum triisopropyl, aluminum tributyl, aluminum triisobutyl, aluminum isobutyl sesquihalide, aluminum diethyl hydride, aluminum butyl dichloride and the like. The aluminum alkyl sesquihalides are preferred and the species aluminum ethyl sesquichloride produces particularly superior results.

In the modification (a) in which the catalyst consists of a cobalt or nickel salt and an acidic metal halide the catalyst is prepared as a complex of the two ingredients. These catalysts are very simple to prepare. In essence, all that is required is that the catalyst components be mixed in a hydrocarbon diluent and the complex be permitted to form. Preferably the hydrocarbon diluent for the monomer and the catalyst preparation should be the same and accordingly benzene or benzene-containing mixtures are preferred for the catalyst preparation. The catalyst formation is hastened if the hydrocarbon diluent containing the catalyst components is refluxed for a period ranging from a few minutes to a few hours. Alternatively, the catalyst may be permitted to form from the components by merely allowing the mixture to stand for several hours. Best results are obtained when the maximum amount of the catalyst components react and go into solution in the hydrocarbon diluent. In the most preferred embodiment the catalyst components are added to the hydrocarbon diluent, the mixture is heated and thereafter the excess solids are removed by filtering, centrifuging or decanting. The catalyst is then in a soluble form which is contained in the hydrocarbon diluent. In the preferred preparations of this type of catalyst, the mol ratio of the acidic metal halide to the transition metal halide during the catalyst preparation is greater than that in the final catalyst. The preferred mol ratios in the final catalyst include a two to five fold molar excess of acidic metal halide over cobalt or nickel halide. The quantity of the complex catalyst in solution may vary from 5 to 50,000 p.p.m. of the diluent and preferably is in the order of 5 to 2,000 p.p.m.

In the preparation of the catalysts of type (b), which include cobalt or nickel salt, an acidic metal halide and an alkyl aluminum compound, the catalyst may be simply prepared by mixing the catalyst components in a hydrocarbon diluent and permitting the reaction product to form. The remarks made above with respect to the formation of a two-component catalyst also apply to the preparation of such a three-component catalyst. Another technique for the preparation of the three-component catalyst comprises proceeding as above but excluding the alkyl aluminum initially. After the two inorganic components have been heated in the hydrocarbon diluent and the solid separated, the metal-organic component, which is normally a liquid, is added to yield the reaction product. The solid fraction which is obtained on mixing the first two components need not be separated and, if desired, may remain in the catalyst but this is less preferred because it increases the amount of catalyst residue in the product without corresponding advantages. In the three-component catalyst, the mol ratio of the acidic metal halide to the transition metal halide is preferably greater during the catalyst preparation than in the final catalyst. In the preferred catalysts, the acidic metal halide is finally present in a two to five fold molar excess over the cobalt or nickel salt. The alkyl aluminum compound may be present in any amount in excess of 0 mols and supply some improvement in the reaction conditions and product. Concentrations of the three-component catalyst are in the same range as those of the two-component catalyst.

In the preparation of the two-component catalyst (c), formed from cobalt or nickel salt and an organo aluminum co-catalyst, the catalyst again may be prepared simply by combining the catalyst components in a hydrocarbon diluent. The components may be added in any order but if a catalyst is to be prepared from an aluminum trialkyl it should aged before being used. The aging may be conveniently accomplished by heating to temperatures up to the boiling point of the diluent and permitting the catalyst contained in the diluent to cool. Alternatively, aging may be accomplished by permitting the catalyst composition to stand for several hours at room temperature. In preparing the catalyst it is preferred that the mol ratio of the cobalt or nickel halide to the organo aluminum compound be greater than 1. A minimum ratio of about 1.5:1 is especially preferred. While there is no maximum which limits the operativeness of the catalyst, practical considerations establish a ratio of about 5:1 as a suitable upper limit. In the preferred embodiment the mol ratio of cobalt or nickel halide to organo aluminum compound is approximately 3:1.

In all catalyst preparations the components are preferably employed in substantially pure anhydrous form. Small concentrations of some impurities may, however, be tolerated in the catalyst components.

The catalysts may be added as such or in combination with a solid carrier, or in solvent solution. It is usually preferred to employ a solvent solution. Suitable solvents include benzene, toluene, xylene, cyclohexane, methylcyclohexane and the like. If solvent solutions are employed they generally comprise from about 3% to 10% of the total polymerization mixture.

The amount of the nickel or cobalt catalyst employed may vary. In general, only small amounts, e.g., amounts ranging from about .001 to about 0.01 mol per mol of the conjugated diene, are very satisfactory. Larger amounts of the catalyst, e.g., 0.01 to 0.1 mol may be employed but there appears to be no substantial advantage obtained by using such larger amounts.

When using the co-catalysts with the above-described nickel or cobalt salts, the ratio of the components may vary over a considerable range. In some cases, the weight ratio of the metal salt to organo aluminum compound may vary from about 1.5:1 to about 1:50. Preferably, the metal salt and organo aluminum compounds are utilized in weight ratios varying from about 1:5 to 1:35.

The polymerization is accomplished by contacting the monomer to be polymerized with the above-described catalysts in the presence of a zinc dialkyl.

It has been found that some catalyst systems are extremely sensitive to trace impurities usually present in zinc dialkyls, so that erratic results may be produced unless a special technique is employed for purifying the zinc dialkyl. That technique consists essentially of contacting technical grade zinc dialkyl with a strong reducing metal and recovering purified dialkyl. Preferably the purification consists of refluxing zinc dialkyl over sodium metal or barium metal or similar alkali or alkaline earth metal and subsequently distilling off purified zinc dialkyl. Although zinc dialkyl may be employed without such elaborate pretreatment and result in satisfactory polymerization when it is used in small concentrations as an adjunct of an aluminum alkyl reducing agent, it is preferable to employ in the process of this invention zinc dialkyl which is purified in accordance with said procedure.

Suitable zinc dialkyl compounds for use in this invention are those having from 1 to 10 carbon atoms in each alkyl group. Usually the two alkyl groups are identical but they may be different, if desired. Zinc diethyl and zinc dipropyl are preferred compounds both because they produce superior results and for economic reasons. Other zinc dialkyls can be used, e.g., zinc dimethyl, zinc di-n-butyl, zinc diisobutyl, zinc diamyl, zinc dihexyl, zinc didecyl, zinc diphenyl, zinc ditolyl and the like.

The amount of the zinc dialkyl employed in the process contains 15 to 150 parts of zinc per million parts of solution. Preferably the amount of zinc is 50 to 125 parts per million parts of solution. The exact amount selected will be determined by the molecular weight (as represented by intrinsic viscosity determinations) desired, the use of the larger amounts of the zinc dialkyl giving the lower molecular weights and the use of the smaller amounts giving the higher molecular weights.

The temperature employed will depend upon the exact catalyst utilized. Temperatures generally range from about 0° C. to about 100° C. Temperatures between 15° C. and 60° C. are particularly preferred as they generally give products having a higher proportion of the cis 1,4 addition product.

The process is conducted in an inert atmosphere. This is preferably accomplished by first sweeping out the reaction zone with an inert gas. Suitable inert materials include nitrogen, methane, and the like.

The process should also be conducted under substantially anhydrous conditions. This is accomplished by using anhydrous reactants and dry reaction vessels and maintaining customary precautions during the reaction to keep water out of the reaction vessel.

The most convenient operating pressure is that which is created by the system and will vary depending upon the specific nature of conjugated diene, the solvent and their respective amounts. For convenience, such pressures are termed "autogenic" pressures. If desired, higher or lower pressures may be employed.

A particularly preferred method of operation is to combine the solvent and catalyst, introduce the monomer into this mixture and then heat the combined mixture to the desired temperature. In the case of monomers, such as butadiene, it is preferred to add the catalyst to the solvent, and then introduce the dry butadiene into the solvent-catalyst mixture over a period of time. The rate of addition is preferably such that the heat of reaction is dispersed without the application of external cooling means. External cooling means may be applied if desired, however, to speed the rate of addition. In the preferred method of operation, the time required for the reaction will depend upon the rate of addition of monomer as well as the reaction temperature. At the preferred temperature of 15° C. to 60° C. with the addition of butadiene over a period of time, the polymerization can conveniently be carried out in from about 5 minutes to about 4 hours.

The reaction mixture is preferably agitated during the course of the reaction. This may be accomplished by mounting the reactor on a rocker or by use of suitable stirrers. Further, the reactor should preferably be equipped with suitable inlets for feeding the monomer and a set of inlets and outlets for circulating an inert gas to purge air from the vessel. A separate inlet may be supplied whereby catalyst may be added during the course of the reaction. If continuous operations are to be employed then the inlet for catalyst and solvent is necessary as well as an outlet for the continuous withdrawal of polymer solution.

At the completion of the reaction, the mixture is then treated with a proton donor to deactivate the metal catalyst. This includes material having active hydrogen, such as water, mineral or organic acids, mercaptans, alcohols and the like. This is preferably accomplished by addition of a small amount of isopropyl alcohol. A larger amount of the alcohol may then be added to coagulate the polymer.

The polymers prepared by the process of the invention will have a high cis 1,4 structure, e.g., at least 90% and preferably above 96% cis 1,4-structure, as determined by infrared analysis. They will preferably have intrinsic viscosities no greater than 5.0 and preferably between 1.5 and 3.0. These intrinsic viscosities are determined in toluene by conventional procedure.

The polymers prepared by the process of the invention may be utilized for a great many important industrial applications. The polymers may be used, for example, in the preparation of molded rubber articles, such as tires, belts, tubes and the like or may be added alone or with other polymeric materials to known rubber compositions to improve specific properties, such as resilience. The polymers of the invention may also be used in the preparation of impregnating and coating compositions or may be combined with asphalts, tars and the like to form surfacing compositions for roads and walkways.

In forming rubber articles from the polymers produced by the process of the invention, it is preferred to compound the polymer with the necessary ingredients, such as, for example, tackifiers, plasticizers, stabilizers, vulcanizing agents, oils, carbon black and the like, and then heating to effect vulcanization. Preferred vulcanizing agents include, among others, sulfur, sulfur chloride, sulfur thiocyanate, thiuram polysulfides and other organic polysulfides. These agents are preferably used in amounts varying from about 0.1 part to 10 parts per 100 parts of rubber. Vulcanization temperatures preferably range from about 100° C. to about 175° C. Preferred temperatures range from about 125° C. to 175° C. for a period of 15 to 60 minutes.

To illustrate the manner in which the invention may be carried out, the following examples are given. It is to be understood, however, that the examples are for the purpose of illustration and the invention is not to be regarded as limited by any of the specific conditions cited therein.

*Example I*

This example illustrates the preparation of polybutadiene having a high cis 1,4 content employing an anhydrous cobaltous chloride-aluminum ethyl sesquichloride catalyst in the presence of zinc diethyl.

Forty-seven parts of benzene, 15 parts of dry butadiene, cobalt chloride-aluminum ethyl sesquichloride catalyst solution, and zinc diethyl solution such that the final amounts of cobalt, aluminum and zinc are 3, 260 and 104 parts per million of reaction mixture, respectively, are placed in a glass vessel. Nitrogen is passed into the vessel to remove any molecular oxygen and the vessel is then sealed and maintained at about 20° C. for about one quarter hour. The vessel is then opened and 1 part of isopropyl alcohol added to kill the catalyst. The reaction mixture is then poured into isopropyl alcohol to coagulate the polybutadiene. The polymer is washed and dried. Infrared analysis indicates the polymer has teh following structure: 96.3% cis 1,4, 2.8% 1,2 and 0.9% trans 1,4. Intrinsic viscosity in toluene is 2.9 dl./g.

A related experiment conducted in the absence of zinc diethyl gives a product having an intrinsic viscosity in toluene of 7.2.

In a series of experiments in which the amount of zinc, added as zinc diethyl, was varied from 15 to 150 parts per million of reaction mixture, polymers of high cis content with intrinsic viscosities from 5 to 1.5 dl./g. were obtained. The rate of polymerization decreased with increasing amounts of zinc.

One hundred parts of the polybutadiene prepared in the presence of zinc diethyl is mixed and milled with 2 parts phenyl-beta-naphthylamine, 5 parts zinc oxide, 3 parts stearic acid, 50 parts high abrasion furnace black, 1.5 parts of N-cyclohexyl-2-benzothiazole-sulfenamide and 0.2 part of sulfur and the resulting product cured for 25 minutes at 135° C. The milling is easier than with the higher molecular weight product produced above without the zinc diethyl. The resulting product is a hard rubbery sheet having good resiliency, which is retained even at low temperatures, and good abrasion resistance.

*Example II*

This example illustrates the preparation of polybutadiene having high cis 1,4 content employing a cobaltous chloride-aluminum triisobutyl catalyst in the presence of zinc diethyl.

Forty parts of benzene, 12 parts of dry butadiene, 2 parts of a benzene solution of catalyst prepared by reacting 18 parts $CoCl_2$ (anhydrous) with 9 parts aluminum triisobutyl in 300 parts benzene, and 0.1 part of a benzene solution of 1.7 mols zinc diethyl per liter are added to a glass ampoule. Nitrogen is passed into the ampoule to remove any molecular oxygen and the ampoule then sealed and maintained at about 30° C. for several hours.

The ampoule is then opened and one part of isopropyl alcohol added to the reaction mixture to kill the catalyst. The reaction mixture is then poured into isopropyl alcohol to coagulate the polybutadiene. The polymer is washed and dried. Infrared analysis indicated that the polymer has approximately the following structure: 97.4% cis 1,4, 1.7% 1,2, 0.9% trans 1,4. Intrinsic viscosity in toluene is 2.9 dl./g. A related experiment conducted in the absence of zinc diethyl gives a product having an intrinsic viscosity of 8.6 dl./g. and much poorer processing characteristics.

One hundred parts of the polybutadiene prepared as above is easily mixed and milled with 2 parts phenyl-beta-naphthylamine, 5 parts zinc oxide, 3 parts stearic acid, 50 parts high abrasion furnace black, 1.5 parts of N-cyclohexyl-2-benzothiazole-sulfenamide and 0.2 part of sulfur and the product cured for 25 minutes at 135° C. The resulting product is a hard rubbery sheet having good resiliency even at low temperatures and good abrasion resistance.

*Example III*

This example illustrates the preparation of polybutadiene having a high cis 1,4 content employing an anhydrous nickel chloride-aluminum triethyl catalyst in the presence of zinc diethyl.

Forty parts of benzene, 12 parts of dry butadiene and 2 parts of a benzene solution of a catalyst prepared by reacting 18 parts of anhydrous nickel chloride with 9 parts of aluminum triethyl in 300 parts of benzene and 0.1 part of a 1.7 molar solution of zinc diethyl in benzene, are added to a glass ampoule. Nitrogen is passed into the ampoule to remove any molecular oxygen and the ampoule is sealed and maintained at about 30° C. for several hours. The ampoule is then opened and 1 part of isopropyl alcohol added to kill the catalyst. The reaction mixture is then poured into isopropyl alcohol to coagulate the polybutadiene. The polymer is washed and dried. Infrared analysis indicates the polymer has a cis 1,4 content of about 95%. Intrinsic viscosity in toluene is about 1.0.

The product is easily formed into a rubber as in Example I.

*Example IV*

This example illustrates the preparation of polyisoprene employing a cobaltous chloride-aluminum ethyl sesquichloride catalyst in the presence of zinc diethyl.

Forty parts of benzene, 12 parts of dry isoprene and 2 parts of a benzene solution of catalyst giving 6 parts, 200 parts and 80 parts respectively of cobaltous chloride, aluminum ethyl sesquichloride and zinc diethyl per million parts of final reaction mixture are added to a glass ampoule. Nitrogen is passed into the ampoule to remove any molecular oxygen and the ampoule sealed and maintained at about 30° C. for several hours. The ampoule is then opened and 1 part of isopropyl alcohol added to the reaction mixture to kill the catalyst. The reaction mixture is then poured into isopropyl alcohol to coagulate the polyisoprene. The polymer is washed and dried. Infrared analysis indicates the polymer has a high cis 1,4 structure and a low intrinsic viscosity.

One hundred parts of the polyisoprene prepared as above is mixed and milled with 2 parts phenyl-beta-naphthylamine, 5 parts zinc oxide, 3 parts stearic acid, 50 parts high abrasion furnace black, 1.5 parts of N-cyclohexyl-2-benzothiazole-sulfenamide and 0.2 part sulfur and the product cured for 25 minutes at 135° C. The resulting product is a hard rubbery sheet having good resiliency and good abrasion resistance.

*Example V*

Forty parts of benzene, 15 parts of butadiene, 1 part of the soluble portion resulting from the reaction of 11 grams aluminum chloride with 1 gram of cobalt chloride in 80 milliliters of benzene at reflux for several hours, and 0.12 part of a 1.7 molar solution of zinc diethyl in benzene are added to a nitrogen-flushed vessel whereupon polymerization begins at room temperature and normal pressure with constant agitation. After about 10 minutes the solution is very viscous and polymerization is ended by addition of isopropanol. The mixture is then poured into isopropyl alcohol to coagulate the polymer. The polymer is washed and dried. Infrared analysis indicates the product to have 97.3% of the cis 1,4 structure. The intrinsic viscosity is 3.1 dl./g.

*Example VI*

Examples I to V are repeated with the exception that zinc dimethyl and zinc dipropyl are used in place of zinc diethyl. Similar products of low intrinsic viscosity are obtained.

*Example VII*

Examples I to VI are repeated with the exception that the monomer employed is a mixture of 90 parts of butadiene and 10 parts of isoprene. The resulting products have low molecular weights and high cis 1,4 structure.

Although zinc dialkyls are usually added as such, they may also be formed in situ by adding a suitable zinc compound, e.g., zinc fluoride or stearate, which interacts with aluminum alkyl to form zinc alkyl and an aluminum salt.

We claim as our invention:

1. A process for polymerizing conjugated diolefin hydrocarbons of 4 to 9 carbon atoms per molecule which comprises contacting the conjugated diolefin in substantially anhydrous solution in the presence of 15 to 150 parts by weight of zinc, present as zinc dialkyl, per million parts of solution, with a catalyst consisting of dissolved reaction product of a salt from the group consisting of divalent nickel and cobalt halides with at least one compound from the group consisting of aluminum halide and aluminum alkyl compounds, said amount of zinc dialkyl being selected to control the intrinsic viscosity of the polydiolefin product to a desired value which is lower than that resulting from polymerization in the absence of said zinc dialkyl.

2. A process for polymerizing conjugated diolefin hydrocarbons of 4 to 9 carbon atoms per molecule which comprises contacting the conjugated diolefin in substantially anhydrous solution in the presence of 15 to 150 parts by weight of zinc, present as zinc dialkyl, per million parts of solution, with a catalyst consisting of dissolved reaction product of a salt from the group consisting of divalent nickel and cobalt halides and a co-catalyst selected from the group consisting of: (a) aluminum halides, (b) combinations of aluminum halides and aluminum alkyl compounds, and (c) aluminum alkyl compounds, said amount of zinc dialkyl being selected to control the intrinsic viscosity of the polydiolefin product to a desired value which is lower than that resulting from polymerization in the absence of said zinc dialkyl.

3. A process for polymerizing conjugated diolefin hydrocarbons of 4 to 9 carbon atoms per molecule which comprises contacting the conjugated diolefin in substantially anhydrous solution in the presence of 15 to 150 parts by weight of zinc, present as zinc dialkyl, per million parts of solution with a catalyst consisting of the dissolved reaction product of divalent cobalt halide with aluminum chloride and an alkyl aluminum compound, said amount of zinc dialkyl being selected to control the intrinsic viscosity of the polydiolefin product to a desired value which is lower than that resulting from polymerization in the absence of said zinc dialkyl.

4. A process as in claim 3 wherein the conjugated diolefin is butadiene.

5. A process as in claim 3 wherein the conjugated diolefin is isoprene.

6. A process as in claim 3 wherein the combined catalyst is cobaltous chloride-aluminum chloride-aluminum alkyl sesquihalide.

7. A process as in claim 3 wherein the combined catalyst is cobaltous chloride-aluminum chloride-aluminum trialkyl.

8. A process as in claim 3 wherein the temperature employed in the process is between 15° C. to 60° C.

9. A process as in claim 3 wherein the amount of zinc in said zinc dialkyl is 15 to 150 parts per million parts of reaction mixture.

10. A process as in claim 3 wherein the zinc dialkyl is zinc dimethyl.

11. A process as in claim 3 wherein the zinc dialkyl is zinc diethyl.

12. A process as in claim 3 wherein the zinc dialkyl is zinc dipropyl.

13. A process for producing polybutadiene having a high cis 1,4 structure and a workable molecular weight which comprises contacting the butadiene in benzene solution in the presence of 15 to 150 parts by weight of zinc, added as zinc dialkyl, per million parts of solution with a catalyst consisting of dissolved reaction product of divalent cobalt chloride and an aluminum alkyl at a temperature between 15° C. and 60° C., said amount of zinc dialkyl being selected to control the intrinsic viscosity of the polybutadiene to a desired value in the range between 1.0 and 5.0 dl./g., determined in toluene at 25° C.

14. A process for producing polybutadiene having a cis 1,4 structure in excess of 96% and an intrinsic viscosity, measured in toluene at 25° C., of 1.0 to 5.0 dl./g., which comprises contacting butadiene in benzene solution in the presence of 50 to 125 parts of zinc diethyl per million parts of solution, with a catalyst consisting of a solution of cobalt chloride and aluminum ethyl sesquichloride at a temperature between 15° C. and 60° C.

References Cited in the file of this patent

UNITED STATES PATENTS

| | | |
|---|---|---|
| 2,905,659 | Miller et al. | Sept. 22, 1959 |
| 2,953,554 | Miller et al. | Sept. 20, 1960 |
| 2,953,556 | Wolfe et al. | Sept. 20, 1960 |
| 2,965,625 | Anderson | Dec. 20, 1960 |
| 2,977,349 | Brockway et al. | Mar. 28, 1961 |

FOREIGN PATENTS

| | | |
|---|---|---|
| 543,292 | Belgium | June 2, 1956 |
| 789,781 | Great Britain | Jan. 29, 1958 |